United States Patent
Bertolini et al.

(10) Patent No.: US 12,140,186 B2
(45) Date of Patent: Nov. 12, 2024

(54) BEARING UNIT WITH PROTECTION DISC

(71) Applicant: AKTIEBOLAGET SKF, Gothenburg (SE)

(72) Inventors: Andrea A. Bertolini, Carrara (IT); Fausto Baracca, Massa (IT); Pasquale Frezza, Aversa (IT)

(73) Assignee: AKTIEBOLAGET SKF (SE)

( * ) Notice: Subject to any disclaimer, the term of this patent is extended or adjusted under 35 U.S.C. 154(b) by 165 days.

(21) Appl. No.: 17/903,544

(22) Filed: Sep. 6, 2022

(65) Prior Publication Data

US 2023/0072450 A1    Mar. 9, 2023

(30) Foreign Application Priority Data

Sep. 7, 2021    (IT) .................. 102021000022952

(51) Int. Cl.
| | |
|---|---|
| *F16C 19/06* | (2006.01) |
| *F16C 23/08* | (2006.01) |
| *F16C 33/78* | (2006.01) |
| *F16C 33/80* | (2006.01) |

(52) U.S. Cl.
CPC ............ *F16C 33/782* (2013.01); *F16C 19/06* (2013.01); *F16C 23/084* (2013.01); *F16C 33/785* (2013.01); *F16C 33/7886* (2013.01); *F16C 33/805* (2013.01)

(58) Field of Classification Search
CPC ...... F16C 19/06; F16C 23/082; F16C 23/084; F16C 33/782; F16C 33/785; F16C 33/7886; F16C 33/7889; F16C 33/80; F16C 33/805; F16C 35/063
See application file for complete search history.

(56) References Cited

U.S. PATENT DOCUMENTS

| | | | | |
|---|---|---|---|---|
| 2,553,337 | A * | 5/1951 | Shafer | F16C 35/047 411/168 |
| 4,403,814 | A * | 9/1983 | Koss | F16D 1/0847 384/541 |
| 4,537,519 | A * | 8/1985 | LaRou | F16C 23/084 384/537 |
| 5,611,292 | A | 3/1997 | Clark et al. | |
| 6,092,956 | A * | 7/2000 | Swinley | F16D 1/0847 403/373 |

(Continued)

OTHER PUBLICATIONS

Search Report for corresponding Italy Patent Application No. 102021000002952 dated Apr. 30, 2022.

*Primary Examiner* — Phillip A Johnson
(74) *Attorney, Agent, or Firm* — Reed Smith LLP

(57) ABSTRACT

A bearing unit may have a radially outer ring, a radially inner ring, a row of rolling bodies interposed between the radially outer ring and the radially inner ring, a casing inside which the rings of the bearing unit are housed. The bearing unit may further have a sealing device and a disc-like element for protecting the sealing device, made as one piece, entirely of plastic or composite material, axially external with respect to the sealing device, stably anchored in a seat of the casing and having a radial distance (d2) between a radially internal surface of the disc-like element and the radially inner ring ranging between 0.75 mm and 0.95 mm so as to block large-size external contaminants, without making contact with the radially inner ring.

16 Claims, 5 Drawing Sheets

(56) References Cited

U.S. PATENT DOCUMENTS

| | | | |
|---|---|---|---|
| 2010/0046874 A1* | 2/2010 | Hosmer | F16C 33/805 384/488 |
| 2010/0054645 A1* | 3/2010 | Milliken | F16C 33/7806 384/477 |
| 2015/0285309 A1 | 10/2015 | Little | |
| 2016/0229470 A1 | 8/2016 | Suzuki et al. | |
| 2019/0162312 A1* | 5/2019 | Okaji | F16C 19/06 |

* cited by examiner

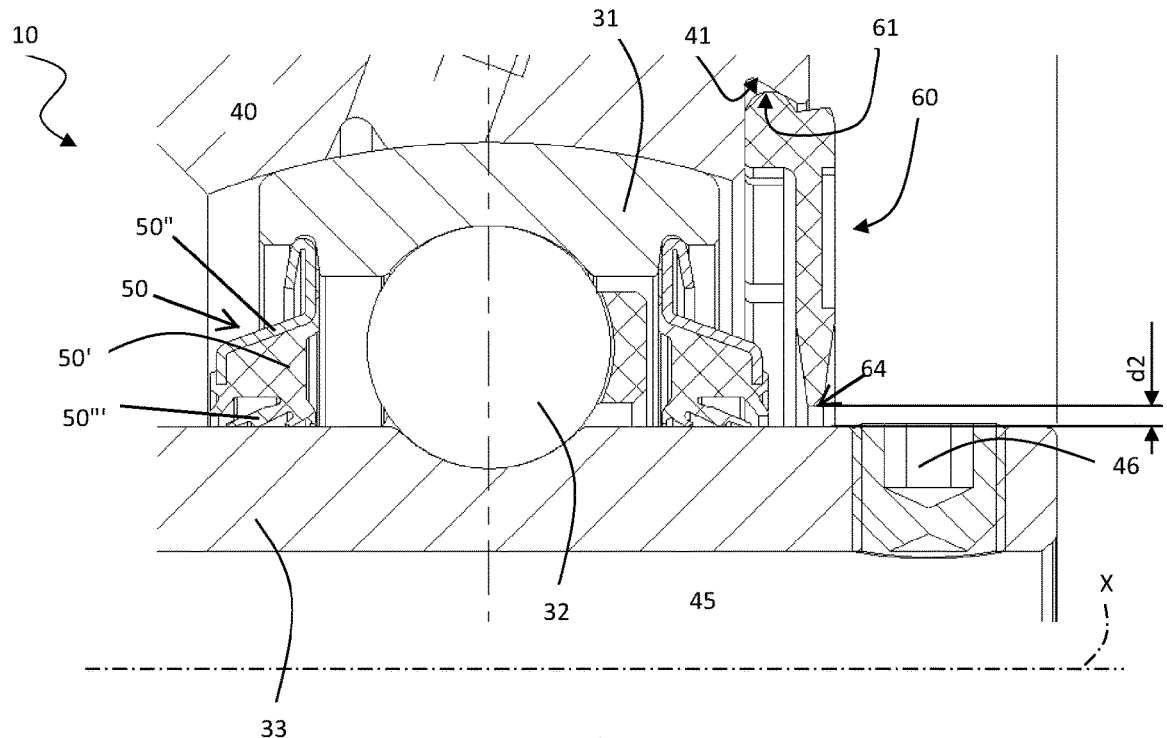
Fig. 1
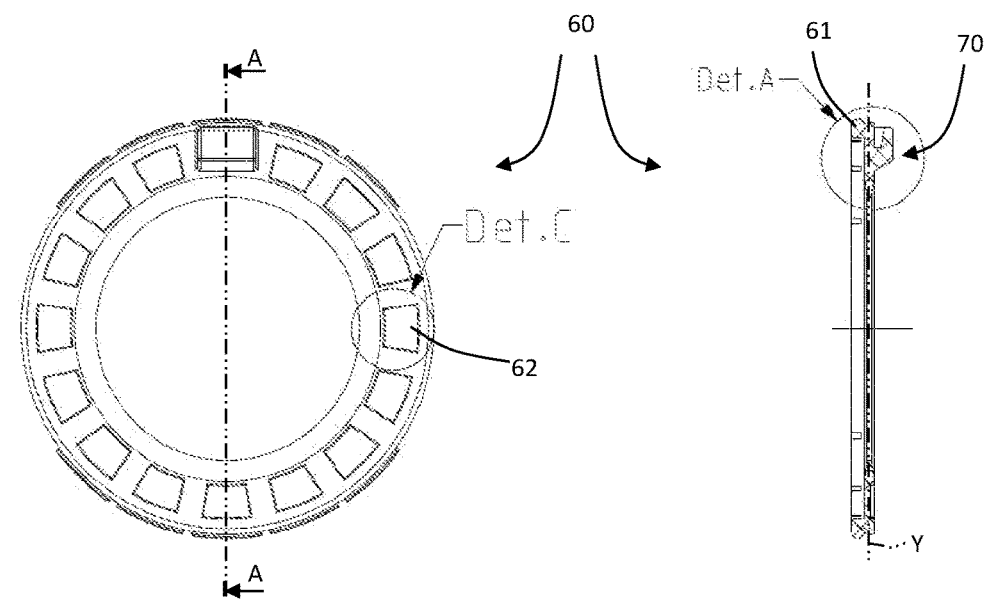
Fig. 2a                    Fig. 2b – Sec. A-A

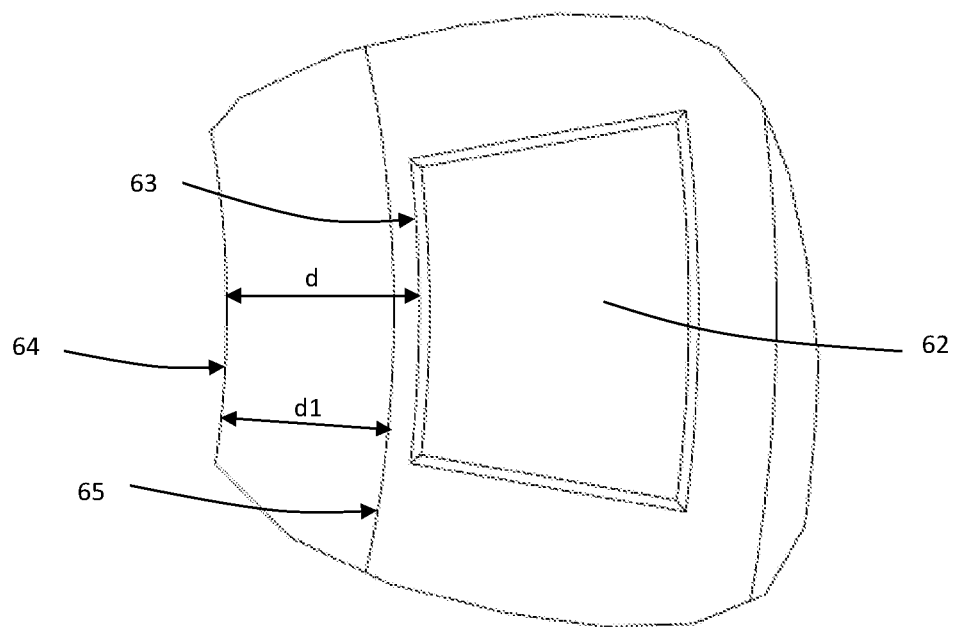
Fig. 3 - Det. C
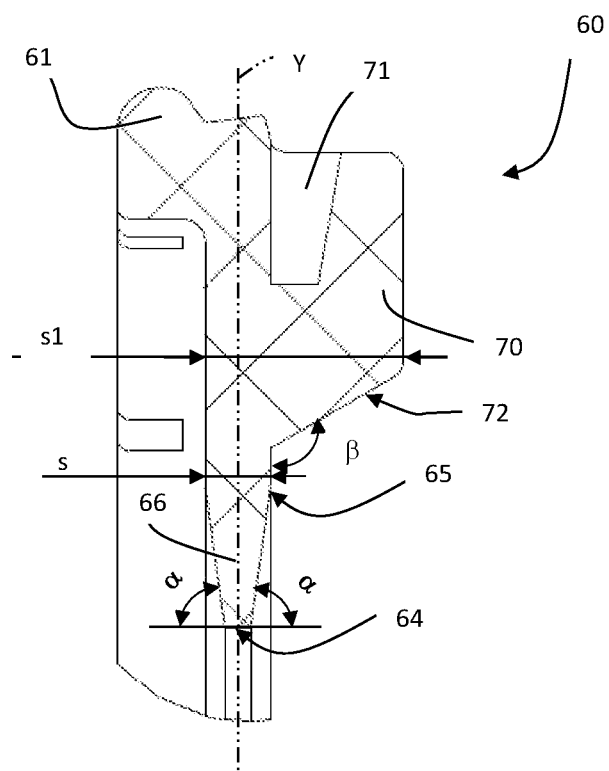
Fig. 4 – Det. A

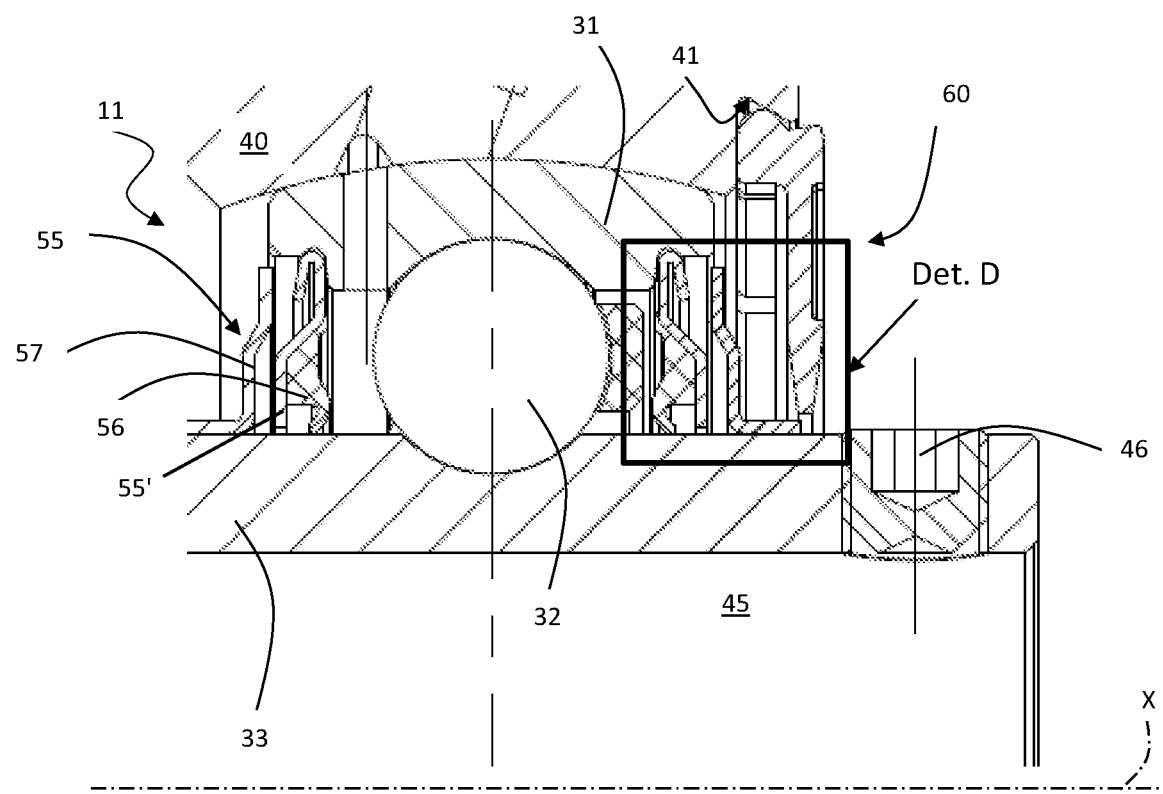
Fig. 5
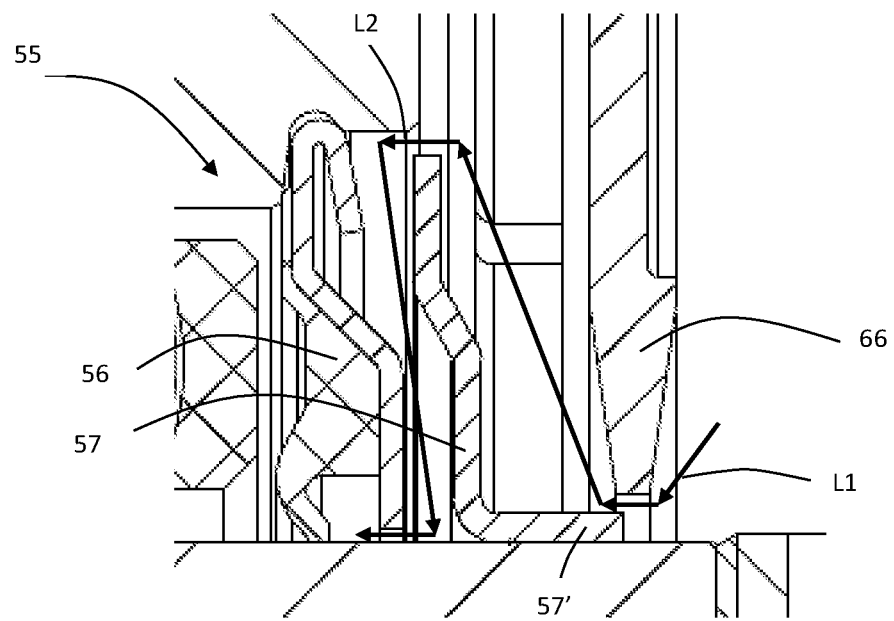
Fig. 6 – Det. D

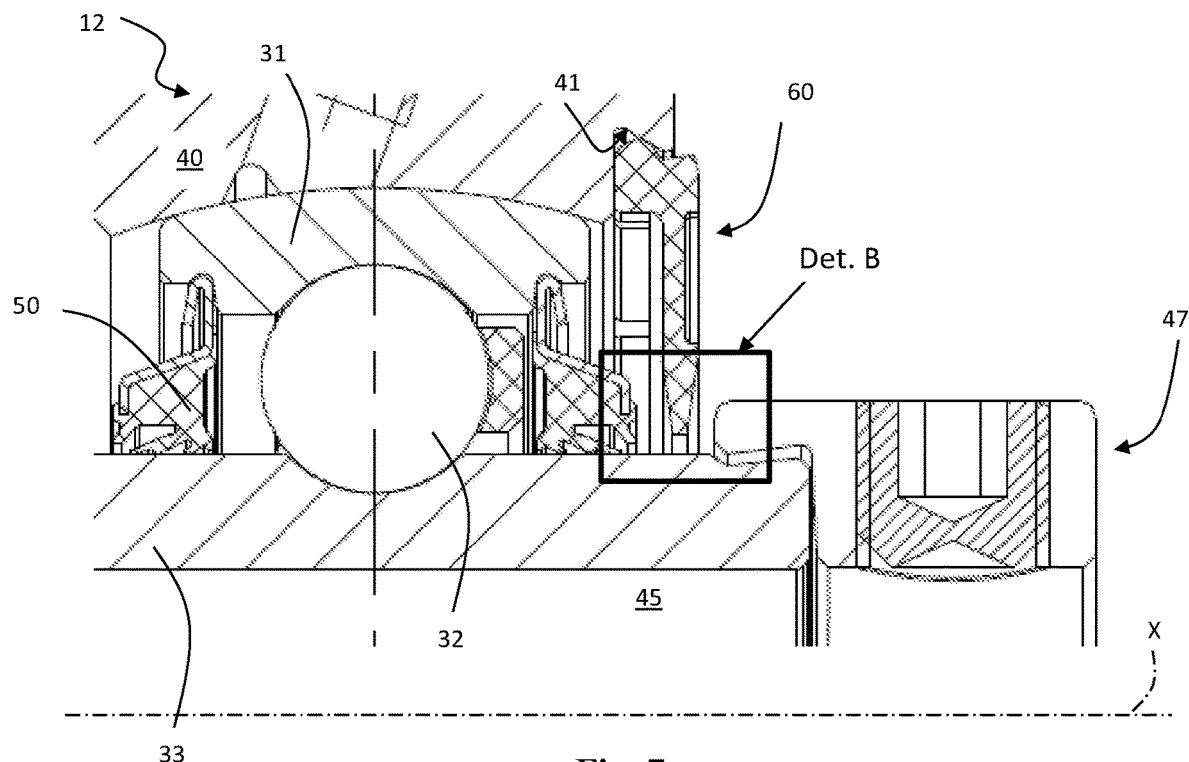
Fig. 7
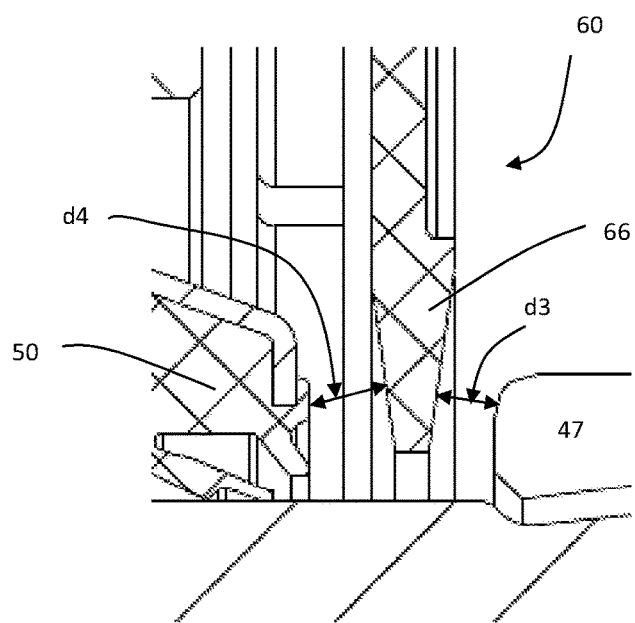
Fig. 8 – Det. B

BEARING UNIT WITH PROTECTION DISC

CROSS-REFERENCE TO RELATED APPLICATIONS

This application is based on and claims priority to Italian Patent Application No. 102021000022952 filed on Sep. 7, 2021, under 35 U.S.C. § 119, the entire disclosure of which is incorporated herein by reference.

FIELD

The present disclosure relates generally to a bearing unit provided with a disc for protecting the sealing device.

BRIEF DESCRIPTION OF THE DRAWINGS

The disclosure will now be described with reference to the attached drawings which illustrate non-limiting exemplary embodiments thereof in which:

FIG. 1 is a cross-sectional view of a bearing unit according to a first exemplary embodiment of this disclosure;

FIG. 2a is a side elevation view of a detail of the bearing unit according to FIG. 1;

FIG. 2b is a cross-section view along the line A-A of FIG. 2a;

FIG. 3 is enlarged detail view C of FIG. 2a;

FIG. 4 is enlarged detail view A of FIG. 2b;

FIG. 5 is a cross-sectional view of a bearing unit according to a second exemplary embodiment of this disclosure;

FIG. 6 is enlarged detail view D of FIG. 5;

FIG. 7 is a cross-sectional view of a bearing unit according to a third exemplary embodiment of this disclosure;

FIG. 8 is enlarged detail view B of FIG. 7; and

DETAILED DESCRIPTION

Figure 9:
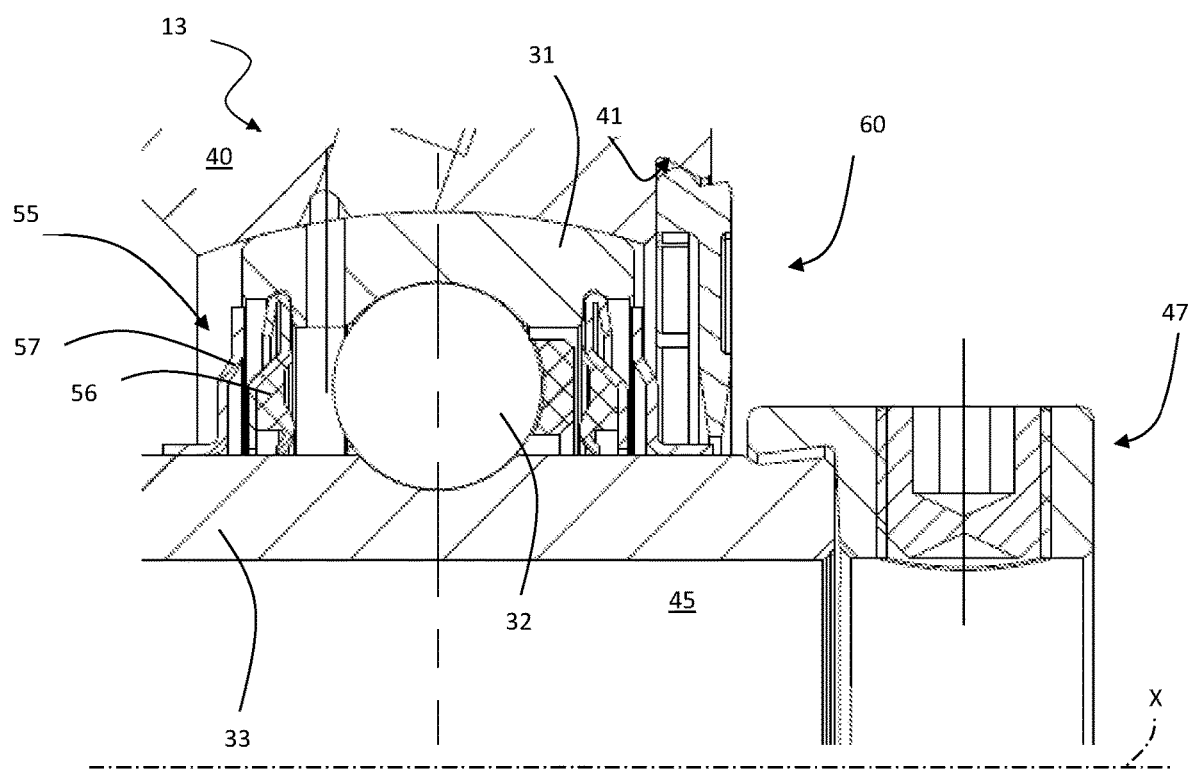
FIG. 9 is a cross-sectional view of a bearing unit according to a fourth exemplary embodiment of this disclosure.

In various embodiments, a bearing unit may be suitable for applications in the manufacturing industry and in particular for applications in the agricultural sector, mining sector and in other applications subject to severe conditions characterized by a dusty environment.

The bearing unit may have a first component, for example a radially outer ring, which is fixed to a stationary element, such as a containment casing, and a second component, for example a radially inner ring, which is fixed to a rotatable element, such as a rotating shaft. In other applications, the radially inner ring may be stationary, while the radially outer ring is rotatable. The rotation of one ring with respect to the other ring is allowed by a plurality of rolling bodies which may be positioned between the cylindrical surface of one component and the cylindrical surface of the second component, such as raceways. The rolling bodies may be spheres, cylindrical or tapered rollers, needle rollers and similar rolling bodies.

The bearing units may have sealing devices for protecting the raceways and rolling bodies from external contaminants and for ensuring a seal against the lubricating grease. The sealing devices may have an elastomeric gasket co-molded onto a first shaped metal screen mounted by an interference fit inside a seat of the rings of the bearing unit, for example of the radially outer ring. The gasket may be provided with at least one contacting or non-contacting sealing lip, which by sliding contact with the other ring of the bearing unit, or by a labyrinth formed with the same ring, performs its sealing function.

In an axially external position with respect to the gasket there may be mounted a second metal screen having the function of protecting the gasket and acting as a first barrier in relation to the external contaminants. This second metal screen may be shaped and mounted by an interference fit on the rotatable radially inner ring.

Differently from other applications, often the bearing units for agricultural applications have only the gasket mounted and do not use the second axially external metal screen. This is due to in agricultural applications the vegetable fibers frequently penetrate between the second screen and the gasket until they cause the separation of the screen from the bearing unit, thus directly exposing the gaskets to the action of the contaminants. The entry of the vegetable fibers inside the space between the second screen and the gasket could be prevented if the second screen were to be also housed inside a seat of the radially outer ring in a position closer to the gasket. However, this solution is not feasible since the production process and the axial play of the bearing are unable to ensure that there is always a minimum distance between screen and gasket: by operating in this manner, therefore, there would be the risk of contact between screen and gasket.

Therefore, in agricultural applications, gaskets having an improved functionality owing to the use of a greater number of sealing lips are envisaged. However, this solution, in addition to requiring larger axial dimensions, results in the gasket directly exposed to the contaminants.

Independently of the use of a standard sealing device—gasket and screen—or of the gasket alone with a greater number of sealing lips, a further drawback of the known solutions arises in applications, for example mining applications, where the performance is verified by passing of a test developed specifically for this kind of application, called a "Sand&Stone" test. During execution of this test, the seals are frequently damaged by the impacts of the stone chippings such that they are deformed and lose their protective function.

Also the use of end covers mounted on the casing in order to protect the bearing unit and the associated sealing devices is not a satisfactory solution since the applications often require small axial dimensions which do not allow the mounting of end covers, both of the open type, for allowing the passage of the shaft, and of the closed type. There therefore exists the need to define a bearing unit provided with special features able to overcome the drawbacks mentioned above.

An object of the present disclosure is therefore to provide a bearing unit, which does not have the drawbacks of conventionally known bearing units. This object is achieved by providing the bearing unit with a disc-like protection element which does not make contact with the rings of the bearing unit and which ensures additional protection against external contaminants, without worsening the friction losses. This disc-like element may be used in applications subject to severe conditions, such as the mining industry, agricultural applications and dusty environments in general.

With reference to FIG. 1, a bearing unit 10 may include a radially outer ring 31 and a radially inner ring 33. The radially outer ring 31 may be stationary and the radially inner ring 33 may be rotatable about a central rotation axis X of the bearing unit 10. The radially inner ring 33 may be coupled to a rotating shaft 45 by a threaded fastening element 46. The bearing unit 10 may further include a row of rolling bodies 32, for example, balls interposed between the radially outer ring 31 and the radially inner ring 33 so as to allow the relative rotation thereof The bearing unit 10 may further include a casing 40 housing the radially outer ring 31 and the radially inner ring 33 of the bearing unit 10. Bearing unit 10 may have applications in the agricultural or mineral sectors, for example.

In the description and the claims, the terms and the expressions indicating positions and orientations, such as "radial" and "axial," are understood as referring to the rotation axis-X of the bearing unit 10.

For simplicity, the reference number 32 will be used to indicate both the single rolling bodies and the row of rolling bodies. Again, for simplicity, the term "sphere" may be used in an exemplary manner in the present description and in the attached drawings instead of the more generic term "rolling body" (and likewise the same reference numbers will be used). It will be understood, rolling bodies different from spheres may be used without departing from the scope of the present disclosure.

The bearing unit 10 may also be provided with a sealing device 50, formed by an elastomeric gasket 50' which may be co-moulded onto a shaped metal screen 50" mounted by chamfering inside a seat of the radially outer ring 31 and provided with a plurality of sealing lips 50'''. The sealing device 50 may be suitable for use in agricultural applications, for example.

According to the present disclosure, the bearing unit 10 may be provided with a disc-like element 60 (FIGS. 2a to 4) for protecting the sealing device 50, made as one piece, entirely of plastic or composite material, and axially external with respect to the sealing device 50. The disc-like element, or protection disc 60 may function to ensure additional protection against external contaminants, while protecting at the same time the sealing device 50 or sealing devices with a different configuration, as will be mentioned below. The protection disc 60 may have a plane of symmetry Y which lies in a radial direction, with respect to which an anchoring portion 61 and at least one pocket 70 are not disposed within the plane of symmetry Y.

The protection disc 60 may be stably anchored in a seat 41 of the casing 40. Both the seat 41 and the corresponding anchoring portion 61 of the protection disc 60 may be made using technology, for example used to anchor an end cover to the casing. This type of anchoring system has reliability characteristics, which have been fully tested in end covers. The anchoring system does not become detached from the bearing unit even in the case of applications, which are subject to intense vibrations. The compact form of the protection disc 60, compared to an axially broader form, such as that of an end cover, provides a more stable anchoring system compared to the anchoring system formed with an end cover.

The protection disc 60 may be used instead of an end cover and may be compatible with the axial dimensions for suitable applications. The use of an end cover (closed or open) requires additional space in the axial direction for mounting. Since it has a bigger surface area, an end cover is more exposed to the external impact of stones or other possible contaminants. The protection disc 60 is instead less subject to these drawbacks since it does not have projections or surfaces which extend axially beyond the dimensions of the casing 40.

In various embodiments, the protection disc 60 may perform the function of creating a further barrier to the external contaminants without causing an increase in the friction losses.

In various embodiments, the protection disc 60 may be compatible with the permissible rotation of the bearing unit. In general, the specifications of the bearing unit may require a permissible rotation of 2° with respect to the axial direction and the protection disc may ensure this rotation without coming into contact with other elements of the bearing unit, for example with the radially inner ring 33, so as not to generate friction losses.

On the other hand, in order to perform the function of providing protection against contaminants, the radial distance d2 (FIG. 1) between a radially internal surface 64 of the protection disc 60 and the radially inner ring 33 must be less than 1 mm. In this way, most of the large-size external contaminants, for example stone chippings, will no longer be able to hit the gaskets, because they are blocked by the protection disc 60. Without direct contact between stone chippings and gaskets, the performance and wear of the gaskets will be significantly improved.

In order to take into account both the aforementioned requirements, the distance d2 may be between about 0.75 mm and about 0.95 mm.

With reference to FIGS. 2a, 2b and 3, the protection disc 60 may have a plurality of recesses 62 in the form of a circular rim sector, arranged circumferentially and equally spaced from each other. The recesses 62 may have a depth varying between about 0.4 mm and about 0.6 mm and have the function of lightening the overall weight of the protection disc 60. The number of recesses may be equal to fifteen and the depth may be about 0.5 mm.

Again in order to reduce the weight of the disc and for applicational requirements of the protection disc 60, as will be explained below, a radially internal portion 66 of the protection disc 60 (FIG. 4) is tapered, namely has a thickness decreasing in the radially internal direction.

In order not to weaken excessively the protection disc 60, the distance d between the radially internal surface 63 of the recess 62 and the radially internal surface 64 of the entire disc 60 is not less than the distance d1 between the same surface 64 and the circle which defines the leading edge 65 of the tapered portion 66. A value of the distance d may be between about 3.7 mm and 3.9 mm.

The protection disc 60 may be compatible with different sealing devices 50. In addition to the sealing device 50, for agricultural applications, already described, sealing devices comprising, in addition to the gasket, also a second axially external shaped screen, made of metallic or elastomeric material, are also compatible with the use of the protection disc 60. For example, and with reference to FIG. 5, a bearing unit 11 in a second embodiment of the present disclosure is shown. This embodiment differs from the preceding embodiment owing to the use of a sealing device 55 comprising an elastomeric gasket 56, co-molded onto a first shaped metal screen 55' and mounted by chamfering inside a seat of the radially outer ring 31 and, in an axially external position with respect to the gasket 56, a second metal screen 57, shaped and mounted by means of interference onto the radially inner ring 33. The protection disc 60, also in this embodiment of the disclosure, may be mounted in an axially external position with respect to the sealing device 55, without the need to modify its dimensions compared to the solution of FIG. 1.

Using this solution, the protection disc 60, in addition to protecting the bearing unit 11 from impacts with external stone chippings, helps improve the performance of the entire sealing device.

Referring to FIG. 6, the protection disc 60 with its tapered portion 66 may define together with a radially internal cylindrical portion 57' of the second metal screen 57 a labyrinth L1, which is joined to and therefore added to the labyrinth L2 defined between the second metal screen 57 and the gasket 56 of the sealing device 55. In this way the possibility of contaminants entering inside the bearing unit 11 is further reduced, without increasing the frictional torque since there is no sliding contact between the protection disc 60 and other components.

In various embodiments, the radially inner ring 33 is integral with the rotating shaft 45 by the threaded fastening element 46. Alternatively, the protection disc 60 may be compatible with other systems for locking the radially inner ring 33 on the shaft 45. For example, and with reference to FIG. 7, a bearing unit 12 in a third embodiment of the present disclosure is shown. This embodiment differs from the embodiment shown in FIG. 1 in that fixing of the radially outer ring 33 onto the shaft 45 is performed by an eccentric locking collar 47 having a greater axial volume than the fixing element 46. Despite this, also in this configuration, it is possible to mount the protection disc 60, without modifying any of its dimensions or the system for anchoring to the casing 40.

With reference to FIG. 9, a bearing 13 unit in a fourth embodiment of the present disclosure is shown. A sealing device 55 of the type used in the configuration of FIG. 5 and fixing of the radially outer ring 33 to the shaft 45 is performed by the eccentric locking collar 47, as can be seen in the configuration of FIG. 7. In the case of this configuration also, which from the point of axial dimensions is the most problematic, it is possible to use the protection disc 60 according to the present disclosure without the need to modify in any way its size or the system for anchoring to the casing 40.

With reference to FIG. 8, the most stringent assembly conditions for the protection disc 60 are applicable to the bearing unit shown in the configuration of FIG. 7, with the sealing device 50 and the eccentric locking collar 47. Taking into account the series of tolerances of the components and the specifications which may require a permissible rotation of 2° of the bearing unit with respect to the axial direction, the minimum distance d3 between the protection disc 60 and the eccentric locking collar 47 may not be less than about 0.2 mm in the worst permissible rotation conditions of the bearing unit. At the same time, a minimum distance d4 of not less than about 1 mm may be ensured between the protection disc 60 and the sealing device 50, again in the worst permissible rotation conditions of the bearing unit. The minimum distance d4 may be within a range of between about 0.75 mm and about 0.95 mm.

These two conditions may be respected by suitably defining in the protection disc 60 the geometric parameters of the tapered portion 66, with a thickness decreasing in the radially internal direction. At the leading edge 65 of the portion 66 the thickness s of the disc 60 may be between about 1.4 mm and about 1.6 mm in order to ensure a sufficient structural strength and good protection from the exterior. The taper angle α of the portion 66, both on the axially internal side (facing the sealing device 50) and on the axially external side (facing the locking collar 47) may be between about 82° and about 84° provided that the values of the minimum distances d3, d4 between the disc 60 and the locking collar 47 and sealing device 50, respectively, are respected.

The compact form of the protection disc 60, compared to an axially broader form, such as that of an end cover, makes the anchoring of the protection disc 60 to the casing 40 very stable. For this reason is it necessary to define a robustness characteristic which allows the protection disc 60 to be removed easily and without causing any breakage of the components. For this purpose, the protection disc 60 is provided with at least one radially external pocket 70 (FIG. 4) which is situated in the vicinity of the anchoring portion 61 and which protrudes in an axially external direction. The pocket 70 may have a recess 71 which allows the insertion of an extractor tool (not shown) of a known type for disassembling the protection disc 60 from the casing 40.

In order to ensure sufficient robustness, the pocket 70 may be provided with side walls around the recess 71, which ensure firm anchoring to the protection disc 60 so that there is no risk of the pocket 70 becoming separated from the protection disc 60 during the disassembly process. Since it is formed on the radially external portion of the protection disc 60, the pocket 70 may be compatible with the use of the locking collar 47 used in the bearing units 12, 13 (FIGS. 7, 9). Furthermore, the robustness of the pocket 70 may be ensured by its axial thickness s1 which may be substantially three times the thickness s of the disc (namely the thickness of the leading edge of the tapered portion 66). Values of the axial thickness s1 of the pocket 70 may be between about 4.4 mm and about 4.6 mm. Finally, the angle β between the plane of symmetry Y of the disc 60 and the radially internal surface of the pocket 70 may be selected to ensure sufficient material for supporting the recess 71. Values of the angle β may be between about 120° and about 122°.

In addition to the embodiments of the disclosure, as described above, it is to be understood that numerous further variants exist. It must also be understood that said embodiments are only examples and do not limit either the scope of the disclosure, nor its applications, nor its possible configurations. On the contrary, although the description provided above enables the person skilled in the art to implement the present disclosure at least in one of its examples of configuration, it must be understood that numerous variations of the components described are feasible, without thereby departing from the scope of the disclosure, as defined in the accompanying claims, interpreted literally and/or in accordance with their legal equivalents.

We claim:
1. A bearing unit, comprising:
 a radially outer ring configured to be stationary during use of the bearing unit;
 a radially inner ring configured to rotate during use of the bearing unit with respect to a rotation axis (X), the radially inner ring configured to be fixed to a rotating shaft for rotation therewith;
 a row of rolling bodies interposed between the radially outer ring and the radially inner ring;
 a casing for housing the radially outer ring and the radially inner ring;
 a sealing device;
 a protection element configured for protecting the sealing device, the protection element comprising a one piece construction comprising a plastic or composite material, the protection element disposed axially external with respect to the sealing device in a seat of the casing, the protection element defining a radial distance (d2) between a radially internal surface of the protection element and the radially inner ring ranging between about 0.75 mm and about 0.95 mm such that the protection element is configured to block external contaminants without making contact with the radially inner ring;

wherein the protection element comprises a radially internal tapered portion, with a thickness decreasing in a radially internal direction.

2. The bearing unit of claim 1, wherein at a leading edge of the tapered portion a thickness (s) of the protection element is between about 1.4 mm and about 1.6 mm.

3. The bearing unit of claim 1, wherein a taper angle (α) of the tapered portion, both on the axially internal side and on the axially external side, is between about 82° and about 84°.

4. The bearing unit of claim 1, wherein:
the sealing device comprises an elastomeric gasket, co-molded onto a shaped metal screen and, a second shaped metal screen in an axially external position with respect to the gasket, and
the tapered portion of the protection element defines with a radially internal cylindrical portion of the second metal screen a first labyrinth (L1) which is joined to a second labyrinth (L2) defined between the second metal screen and the gasket of the sealing device.

5. The bearing unit of claim 4, wherein the protection element comprises a plurality of recesses, in the form of a circular rim sector, arranged circumferentially and equally spaced from each other.

6. The bearing unit of claim 5, wherein each recess of the plurality of recesses comprises a depth varying between about 0.4 mm and about 0.6 mm, and the number of recesses of the plurality of recesses is equal to fifteen.

7. The bearing unit of claim 1, wherein:
the sealing device comprises an elastomeric gasket, co-molded onto a shaped metal screen and, a second shaped metal screen in an axially external position with respect to the gasket, and
the tapered portion of the protection element defines with a radially internal cylindrical portion of the second metal screen a first labyrinth (L1) which is joined to a second labyrinth (L2) defined between the second metal screen and the gasket of the sealing device.

8. The bearing unit of claim 1, wherein the protection element comprises at least one radially external pocket which protrudes in an axially external direction and comprises a recess which is configured to allow the insertion of an extractor tool to be used for the process of disassembly of the protection element from the casing.

9. The bearing unit of claim 1, wherein the protection element comprises a plurality of recesses, in the form of a circular rim sector, arranged circumferentially and equally spaced from each other.

10. The bearing unit of claim 9, wherein each recess of the plurality of recesses comprises a depth varying between about 0.4 mm and about 0.6 mm, and the number of recesses of the plurality of recesses is equal to fifteen.

11. The bearing unit of claim 1, wherein the protection element comprises a plurality of recesses, in the form of a circular rim sector, arranged circumferentially and equally spaced from each other.

12. The bearing unit of claim 11, wherein each recess of the plurality of recesses comprises a depth varying between about 0.4 mm and about 0.6 mm, and the number of recesses of the plurality of recesses is equal to fifteen.

13. The bearing unit of claim 1, wherein the radially inner ring is fixed to the rotating shaft by a threaded fastening element.

14. The bearing unit of claim 1, wherein the radially inner ring is fixed to the rotating shaft by an eccentric locking collar.

15. A bearing unit, comprising:
a radially outer ring configured to be stationary during use of the bearing unit;
a radially inner ring configured to rotate during use of the bearing unit with respect to a rotation axis (X), the radially inner ring configured to be fixed to a rotating shaft for rotation therewith;
a row of rolling bodies interposed between the radially outer ring and the radially inner ring;
a casing for housing the radially outer ring and the radially inner ring;
a sealing device;
protection element configured for protecting the sealing device, the protection element comprising a one piece construction comprising a plastic or composite material, the protection element disposed axially external with respect to the sealing device in a seat of the casing, the protection element defining a radial distance (d2) between a radially internal surface of the protection element and the radially inner ring ranging between about 0.75 mm and about 0.95 mm such that the protection element is configured to block external contaminants without making contact with the radially inner ring;
wherein the protection element comprises at least one radially external pocket which protrudes in an axially external direction and comprises a recess which is configured to allow the insertion of an extractor tool to be used for the process of disassembly of the protection element from the casing.

16. A bearing unit, comprising:
a radially outer ring configured to be stationary during use of the bearing unit;
a radially inner ring configured to rotate during use of the bearing unit with respect to a rotation axis (X), the radially inner ring configured to be fixed to a rotating shaft for rotation therewith;
a row of rolling bodies interposed between the radially outer ring and the radially inner ring;
a casing for housing the radially outer ring and the radially inner ring;
a sealing device;
protection element configured for protecting the sealing device, the protection element comprising a one piece construction comprising a plastic or composite material, the protection element disposed axially external with respect to the sealing device in a seat of the casing, the protection element defining a radial distance (d2) between a radially internal surface of the protection element and the radially inner ring ranging between about 0.75 mm and about 0.95 mm such that the protection element is configured to block external contaminants without making contact with the radially inner ring;
wherein the protection element comprises at least one radially external pocket which protrudes in an axially external direction and comprises a recess which is configured to allow the insertion of an extractor tool to be used for the process of disassembly of the protection element from the casing.

* * * * *